US009487176B2

(12) United States Patent
Loos et al.

(10) Patent No.: US 9,487,176 B2
(45) Date of Patent: Nov. 8, 2016

(54) AIRBAG AND AIRBAG MODULE

(71) Applicant: TRW Automotive GmbH, Alfdorf (DE)

(72) Inventors: Andreas Loos, Rechberghausen (DE); Dominique Acker, Gschwend (DE); Stojan Bogdanovic, Schwabisch Gmünd (DE)

(73) Assignee: TRW Automotive GmbH (DE)

( * ) Notice: Subject to any disclaimer, the term of this patent is extended or adjusted under 35 U.S.C. 154(b) by 0 days.

(21) Appl. No.: 14/769,835

(22) PCT Filed: Mar. 4, 2014

(86) PCT No.: PCT/EP2014/000542
§ 371 (c)(1),
(2) Date: Aug. 24, 2015

(87) PCT Pub. No.: WO2014/135263
PCT Pub. Date: Sep. 12, 2014

(65) Prior Publication Data
US 2016/0001730 A1 Jan. 7, 2016

(30) Foreign Application Priority Data

Mar. 7, 2013 (DE) .................. 10 2013 003 845

(51) Int. Cl.
| *B60R 21/16* | (2006.01) |
| *B60R 21/217* | (2011.01) |
| *B60R 21/231* | (2011.01) |
| *B60R 21/23* | (2006.01) |

(52) U.S. Cl.
CPC ......... *B60R 21/217* (2013.01); *B60R 21/2171* (2013.01); *B60R 21/23* (2013.01); *B60R 21/231* (2013.01)

(58) Field of Classification Search
CPC .................. B60R 21/239; B60R 2021/23576; B60R 21/217; B60R 2021/2172; B60R 21/2338; B60R 21/26
USPC ............. 280/730.1, 730.2, 731, 743.1, 743.2
See application file for complete search history.

(56) References Cited

U.S. PATENT DOCUMENTS

| 6,352,284 | B1 | 3/2002 | Okada et al. | |
| 6,676,158 | B2 * | 1/2004 | Ishikawa | B60R 21/233 280/743.1 |
| 7,648,166 | B2 * | 1/2010 | Maripudi | B60R 21/233 280/728.3 |
| 8,419,055 | B2 * | 4/2013 | Chida | B60R 21/239 280/731 |
| 8,690,185 | B2 * | 4/2014 | Yamaji | B60R 21/233 280/729 |
| 2002/0067032 | A1 * | 6/2002 | Ishikawa | B60R 21/233 280/743.1 |

FOREIGN PATENT DOCUMENTS

| DE | 19851545 | 9/1999 |
| DE | 102008036353 | 2/2010 |
| EP | 2581275 | 4/2013 |
| JP | 2001130364 | 5/2001 |
| JP | 2009166794 | 7/2009 |
| JP | 2011168167 | 9/2011 |

* cited by examiner

*Primary Examiner* — Toan To
(74) *Attorney, Agent, or Firm* — Tarolli, Sundheim, Covell & Tummino LLP

(57) ABSTRACT

An airbag (2) of an airbag module for a vehicle comprising an airbag shell (6) including an inserting orifice (8) for an inflator (4) has at least one reinforcing layer (14) which completely covers the inserting orifice (8).

16 Claims, 6 Drawing Sheets

AIRBAG AND AIRBAG MODULE

RELATED APPLICATIONS

This application corresponds to PCT/EP2014/000542, filed Mar. 4, 2014, which claims the benefit of German Application No. 10 2012 003 845.6, filed Mar. 7, 2013, the subject matter, of which are incorporated herein by reference in their entirety.

BACKGROUND OF THE INVENTION

The invention relates to an airbag for a vehicle. Moreover the invention relates to an airbag module.

In the case of need, airbags for vehicles have to be completely inflated within very short time. The gas required for inflation is provided by an inflator and is supplied to the airbag. For this purpose, it is common that at least the gas discharge orifice of the inflator is provided inside the airbag and at least one cable connection to a control unit exits the airbag. In one construction type of airbag modules the inflator is located completely inside the airbag so that the inflator is mounted in the airbag via an Inserting orifice. So as not to impair the functioning of the airbag it is necessary to seal the Inserting orifice for the Inflator as tightly as possible. The inserting orifice must be dimensioned to be sufficiently large so as to be able to introduce the inflator including fastening extensions present on the same into the airbag, which causes increased leakage, however.

SUMMARY OF THE INVENTION

It is the object of the invention to provide an airbag which has little leakage and is inexpensive to manufacture.

This object is achieved by an airbag for a vehicle comprising an airbag shell including an inserting orifice for an inflator and at least one reinforcing layer which completely covers the inserting orifice. By the reinforcing layer the inserting orifice is tightly sealed and at the same time has to be arranged on the airbag shall in a simple and inexpensive manner. Although in prior art reinforcing layers are provided, they cover the Inserting orifice only partly, however, or are provided in the area of the inserting orifice with slits which are partly congruent with the inserting orifice or vertically intersect the same.

Preferably the reinforcing layer has an approximately trapezoidal cut.

The reinforcing layer is fastened at the periphery of the airbag shell, for example, wherein a boundary portion of the reinforcing layer is not fastened on the airbag shell and thus is open. Due to this peripheral fastening of the reinforcing layer it is possible that between the airbag shell and the reinforcing layer a hollow can form through which the inflator can be introduced.

For example, the reinforcing layer is fastened at the periphery except for the non-fastened peripheral portion on the airbag shell while forming a pouch. The formation of a pouch at the airbag shell results in high tightness of the airbag, as upon inflation of the airbag the pouch closes and thus also seals the inserting orifice. The inflator can be so-to-speak threaded into the interior of the airbag via the only open side of the pouch.

In an embodiment of the invention, the reinforcing layer is fastened to the airbag shell via an at least substantially U-shaped or W-shaped area of a fastening strip, especially wherein the two side legs of the "U" or "W" extend away from each other toward their free ends, thus realizing an inexpensive quick joining seam, for example. Furthermore, the insertion of the inflator is facilitated by the longer open side.

Substantially in this case means that at least the peripheral portion of the fastening strip is U-shaped or W-shaped, i.e. the ends of the fastening strip extending away from the periphery of the reinforcing layer and being adjacent to the side legs, resp., are not taken into account.

In a configuration variant the Inserting orifice, preferably all orifices in the area of the reinforcing layer, has/have a distance from the non-fastened peripheral portion which corresponds to at least one third of the distance of the non-fastened peripheral portion from the side facing the same and being connected to the airbag shell. This ensures that upon inflation of the airbag the reinforcing layer rests tightly on the assembling orifice, as it is distanced relatively far from the open side of the pouch.

At least one fastening orifice which extends through the airbag shall and the reinforcing layer and through which a fastening means can extend outwardly from the inflator can be provided in the airbag.

For example around the fastening orifice a reinforcing strip, for example a seam, is guided which connects the airbag shell to the reinforcing layer, especially wherein the reinforcing strip extends from the center piece of the fastening strip or forms part of the center piece. This ensures that it is only at the open side of the "U" or "W" that the reinforcing layer is not connected to the airbag shell.

The reinforcing strip can be joined to at least one of the ends of the fastening strip so that the reinforcing strip and the fastening strip can be realized in a simple and inexpensive manner.

In a configuration of the invention, the inserting orifice takes the shape of a silt, especially a silt forming a tab, thus facilitating tight sealing of the inserting orifice and inserting the inflator.

Preferably the periphery of the reinforcing layer is spaced from the inserting orifice so that in the area of the inserting orifice between the reinforcing layer and the airbag shell a sufficiently large interstice can be formed to pass the inflator through the latter.

An igniter orifice can extend through the airbag shell and the reinforcing layer, whereby the igniter plug is plugged into the inflator and can partly protrude from the airbag shell, if necessary.

For example, the fastening strip surrounds the igniter orifice at least once tightly and completely, wherein advantageously one of the side legs or the canter place surrounds the igniter orifice so that tearing of the igniter orifice is prevented without making a strongly increased manufacturing effort.

In a further configuration variant between the airbag shell and the reinforcing layer a protective layer is provided which has the same orifices as the airbag shell and is tightly connected to the airbag shell over the full periphery. This protective layer reinforces the airbag shell in the especially stressed area in which the reinforcing layer is fastened.

Preferably the protective layer has a cut substantially equal to the reinforcing layer, wherein the protective layer does not extend beyond the peripheral portion of the reinforcing layer fastened on the airbag shell, however, so that the airbag shell is largely protected against the hot gas exiting an inflator.

In a configuration variant the inserting orifice is arranged between the side legs of the fastening strip or between the center legs of the center piece, thus causing the inserting orifice to be reliably closed by the reinforcing layer.

Furthermore, the invention relates to an airbag module comprising an airbag according to the invention and an inflator having at least one fastening means which laterally projects from the inflator, wherein the airbag has a fastening orifice for the passage of the fastening means the geometry of which substantially corresponds to that of the fastening means and is preferably smaller than the cross-section of the fastening means, in this way leakages around the fastening means are avoided when the airbag tightly contacts the fastening means.

BRIEF DESCRIPTION OF THE DRAWING

Further features and advantages of the invention result from the following description and from the enclosed drawings which are referred to and in which.

DESCRIPTION

Figure 1:
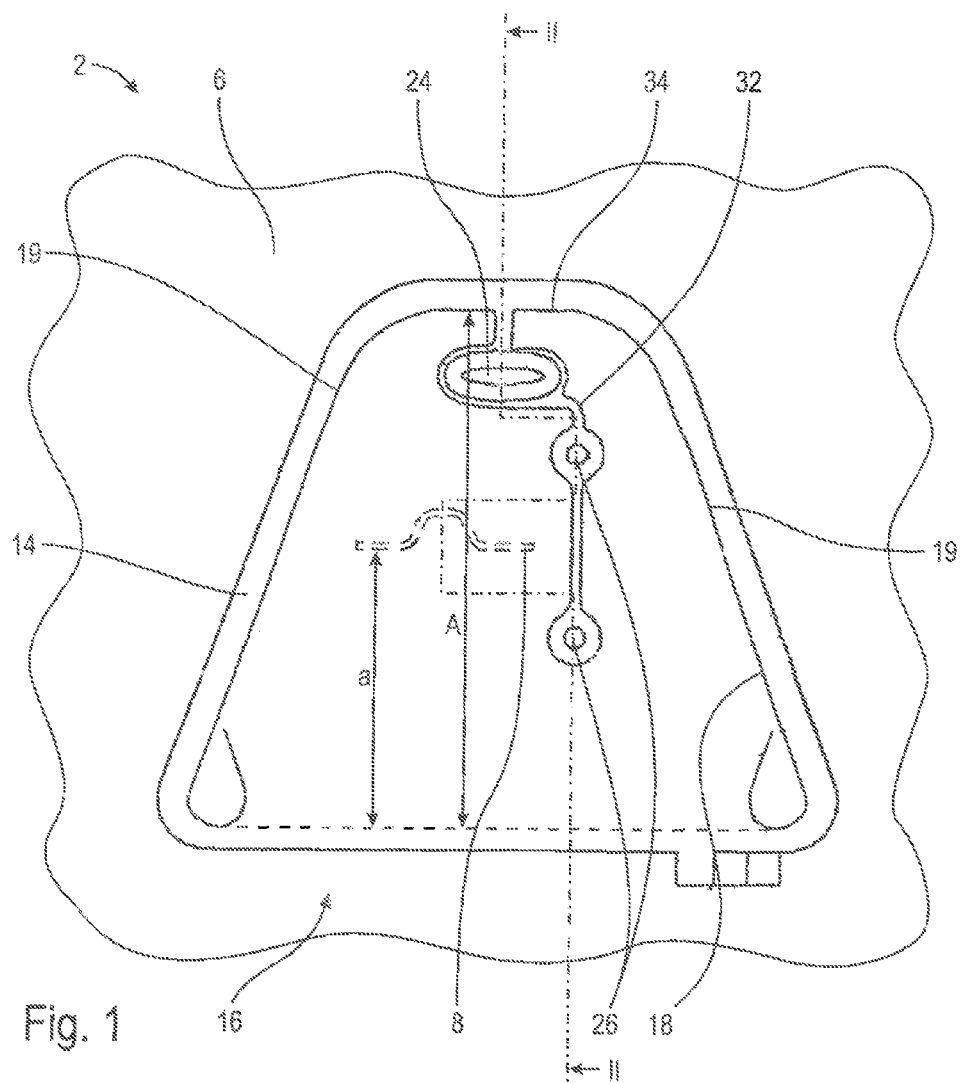
FIG. 1 shows a view of the airbag according to the invention from inside in the area of the inserting orifice.
Figure 2:
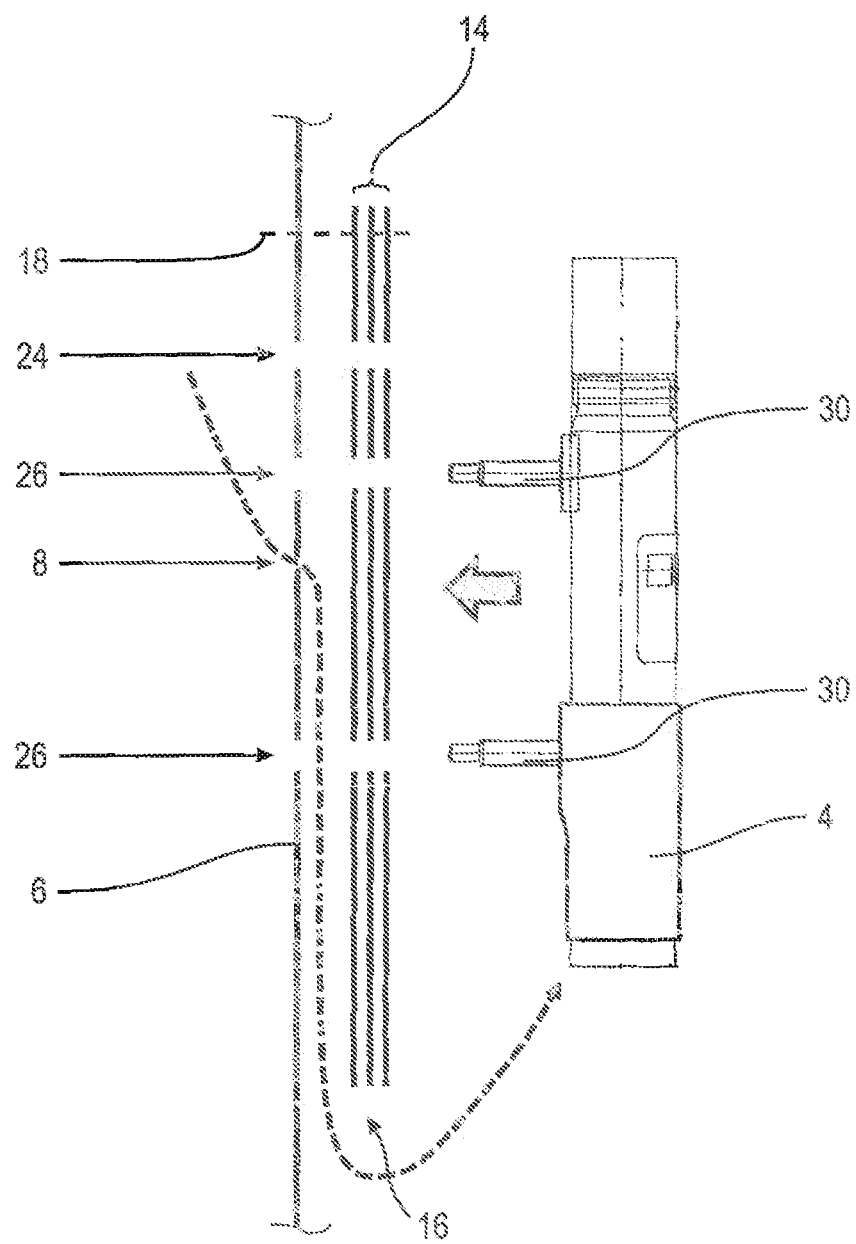
FIG. 2 shows a detailed sectional view across the airbag and the airbag module according to the invention in accordance with FIG. 3 along the line II-II in FIG. 1.

In FIG. 1 an airbag 2 mounted in a vehicle and serving, for example, for restraining a vehicle occupant, is shown in the area of the fastening of the inflator 4 (cf. FIG. 2). In this area the airbag is spread, i.e. it is lying loosely and unfolded on the bottom.

The airbag has an airbag shell 6 which represents the outer airbag wall and separates the interior of the airbag from the environment.

An inserting orifice 8 for inserting the inflator 4 in the airbag shell 6 is in the form of a slit extending in U-shape with the extremities of the legs of the "U" being outwardly extended.

In the area of the inserting orifice 8 at the inside of the airbag shell 6 a reinforcing layer 14 is arranged which is preferably made of fabric material or of the same material as the airbag shell 6.

The reinforcing layer 14 consists, for example, of plural superimposed layers, three single layers in this case.

The shape of the reinforcing layer 14 is substantially trapezoidal.

The reinforcing layer 14 is positioned so that it completely covers the inserting orifice 8, preferably even when the inserting orifice 8 is extended.

The inflator 4 is inserted in the airbag interior via the inserting orifice 8.

The reinforcing layer is fastened, preferably stitched to the airbag shell at its periphery.

However, the fastening of the reinforcing layer 14 is not effectuated to be circumferentially closed along the periphery, rather a preferably rectilinear peripheral portion 16, also referred to as one side of the periphery, is not fastened to the airbag shell in this way a pouch is formed at the airbag shell 6 by the reinforcing layer. The pouch is opened through the inserting orifice 8 toward the outside of the airbag 2 and on the other side is communicated with the interior of the airbag 2 through the non-fastened peripheral portion 16.

By the fact that the reinforcing layer 14 is designed without any opening or slit in the area of the inserting orifice 8 but is closed, however, the inserting orifice 8 is completely covered and sealed by the reinforcing layer 14.

The longitudinal layer 14 is fastened along a so-called fastening strip 18 formed by a seam or an adhesive joint. The fastening strip 18 extends at the periphery of the reinforcing layer and extends substantially in U-shape. The side legs 19 of the "U" extend away from each other toward their free extremities and preferably in parallel to the periphery of the reinforcing layer 14.

Spaced apart from the inserting orifice 8, in the area of the reinforcing layer 14 an igniter orifice 24 formed by aligned openings in the airbag shell 6 and in the reinforcing layer 14 is configured both in the reinforcing layer 14 and in the airbag shell 6.

Moreover, further aligned openings are provided in the airbag shell 6 and the reinforcing layer 14 which in the present case constitute two fastening orifices 26.

The geometry of the igniter orifice 24 substantially corresponds either to the geometry of the igniter plug to be inserted through the igniter orifice 24 or, if here the inflator 4 partly projects from the airbag 2, to this part of the inflator. Preferably, the cross-section of the igniter orifice 24 should be somewhat smaller than the igniter plug to be passed through or the portion of the inflator 4 projecting from the airbag 2 so that a sealing effect is achieved.

As is evident in FIG. 2, fastening means 30 in the form of fastening or screw bolts are arranged at the inflator 4. Those fastening means 30 extend through the fastening orifices 26 to the outside. In this case, too, the fastening orifices 26 should be somewhat smaller than the fastening means 30 so that they are tightly guided through the reinforcing layer 14 and the airbag shell 6.

Around the igniter orifice 24 and the fastening orifices 26 extends a so called reinforcing strip 32 formed by a fastening which connects the airbag shell 6 to the reinforcing layer 14. Said reinforcing strip 32 starts out from the center piece 34 of the fastening strip 18 and closely follows the contours of the igniter orifice 24 and the fastening orifice 28. Thus in total a continuous seam is resulting which is made in one piece and which extends linearly along long distances thereof.

The inserting orifice 8 exhibits a distance from the non-fastened peripheral portion 16 which corresponds to at least one third, preferably to at least 50% of the distance A of the non-fastened peripheral portion 16 from the center piece 34 of the U-shaped fastening strip 18. In other words, this means that the inserting orifice 8 is located at least in the "lower" half of the pouch, related to the bottom of the pouch.

The igniter orifice 24, too, should be located at least in the lower half, preferably in the lower third of the pouch.

For mounting the airbag module (see arrow with broken lines in FIG. 2) the inflator 4 is inserted through the inserting orifice 8 into the pouch between the airbag shell 6 and the reinforcing layer 14. The inflator 4 is moved into the interior of the airbag 2 through the open side of the pouch. Now part of the inflator 4 can be returned through the igniter orifice 24 through the airbag shell 6, and the fastening means 30 of the inflator 4 can be passed through the fastening orifices 26 (cf. FIG. 2).

When the inflator 4 is actuated the airbag 2 is inflated. Accordingly, the reinforcing layer 14 is forced against the airbag shell 6. In this way, the reinforcing layer 14 closes the inserting orifice 8 and thus prevents undesired escape of gas from the interior of the airbag 2. The spacing of the inserting orifice 3 and of the other orifices 24, 28 from the non-fastened peripheral portion 16 prevents undesired inflation of the pouch which would result in gaping of the inserting orifice 8 and thus in escape of gas.

Figure 3:
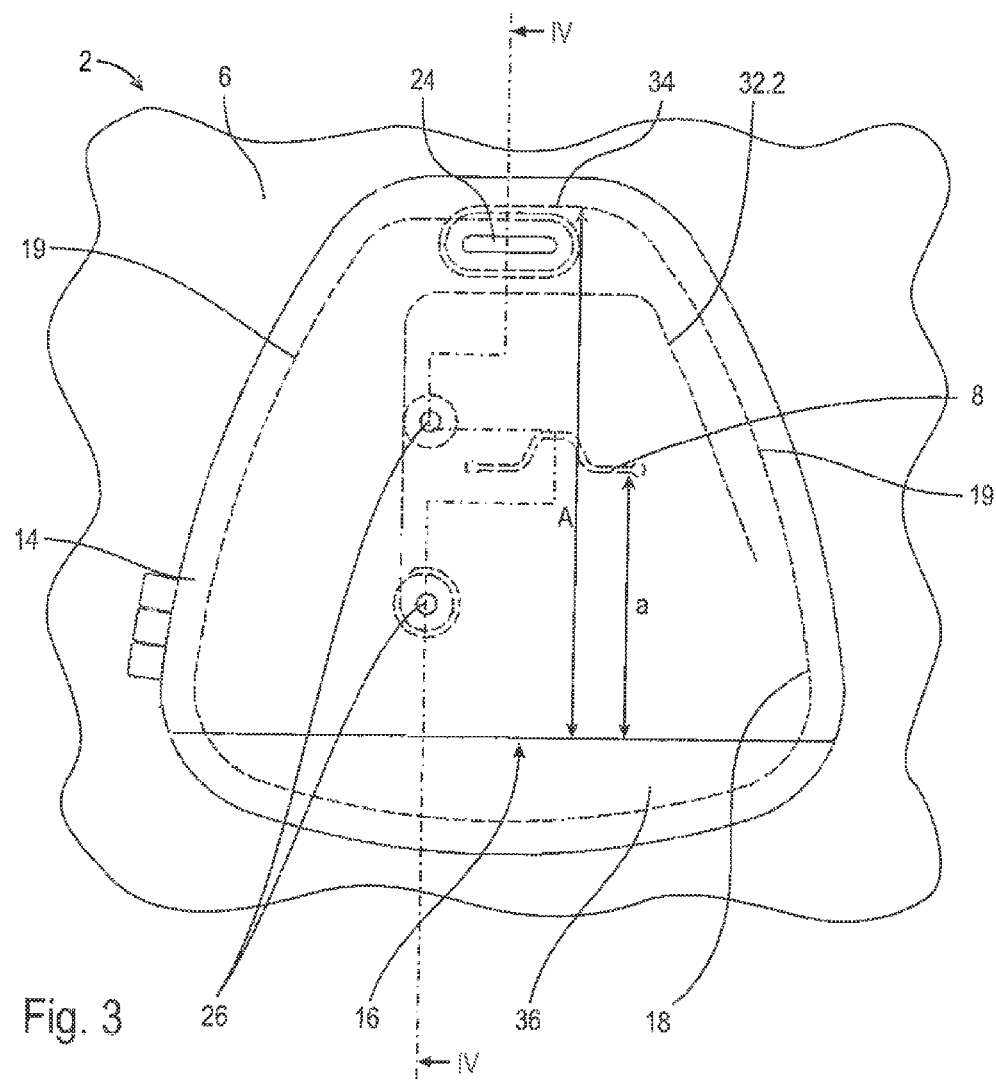
FIG. 3 shows a view of an alternative embodiment of the airbag according to the invention from inside in the area of the inserting orifice.

The embodiment illustrated in FIGS. 3 and 4 largely corresponds to that according to FIGS. 1 and 2, wherein hereinafter only the differences shall be discussed and equal or equally functioning parts are provided with the previously introduced reference numerals.

Figure 4:
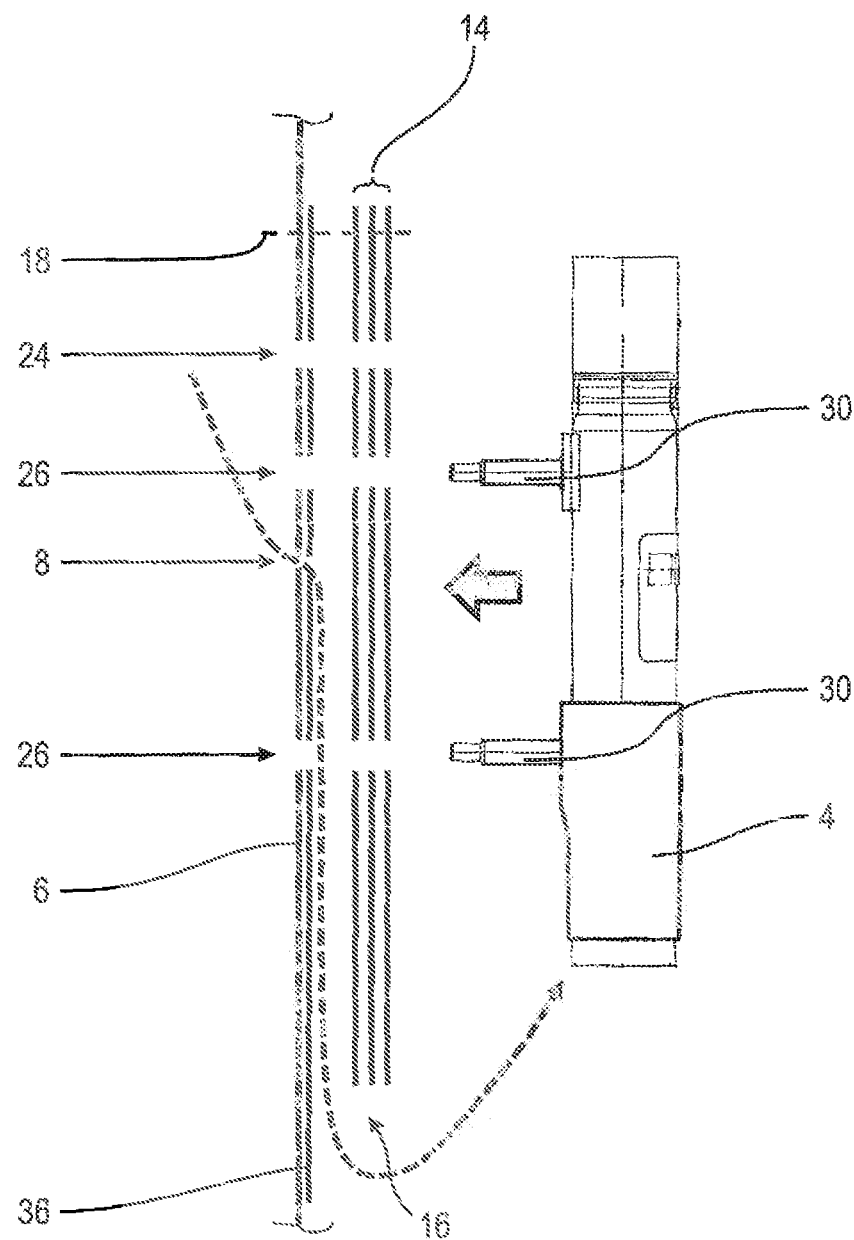
FIG. 4 shows a detailed sectional view across the airbag and the airbag module according to the invention along the line IV-IV in FIG. 3.

In contrast to the first embodiment, a protective layer 36 is provided between the airbag shell 6 and the reinforcing layers 14 (cf. FIG. 4). The protective layer 36 substantially has the same cut and position as the reinforcing layer 14 and includes the same orifices 8, 24, 26 as the airbag shell 6. The orifices of the protective layer 36 are aligned with the orifices 8, 24, 26 of the airbag shell 6 in this case.

However, the protective layer 36 is longer perpendicularly to the center piece 34 toward the peripheral portion 16 than the reinforcing layers 14 so that the protective layer extends beyond the peripheral portion 16 of the reinforcing layers 14 which is not fastened to the airbag shell 6. Moreover, the protective layer 36 is fastened to the airbag shell 6 along its entire periphery and to the reinforcing layers 14 in a U-shaped area, especially by a seam or an adhesive joint.

In this embodiment the protective layer 36 is fastened to the airbag shell 6 and to the reinforcing layers 14 by the fastening strip 18 which at the same time connects the reinforcing layers 14 to the airbag shell 6. The sides of the legs 19 of the U-shaped area of the fastening strip 18 facing away from the center piece 34 are interconnected and fix the projecting peripheral area of the protective layer 36 but not the peripheral portions 16 of the reinforcing layers 14 to the airbag shell 6, as is evident from FIG. 3.

Further, the fastening strip 18 and the reinforcing strip 32.2 are separately configured so that the reinforcing strip 32.2 does not extend from the center piece 34 of the fastening strip 18. In this case at least once the reinforcing strip 32.2 closely fellows the contours of the fastening orifices 26 and runs out in U-shape. On the other hand, the igniter orifice 24 is surrounded by the fastening strip 18 in the area of the center piece 34 at least once tightly and completely.

Figure 5:
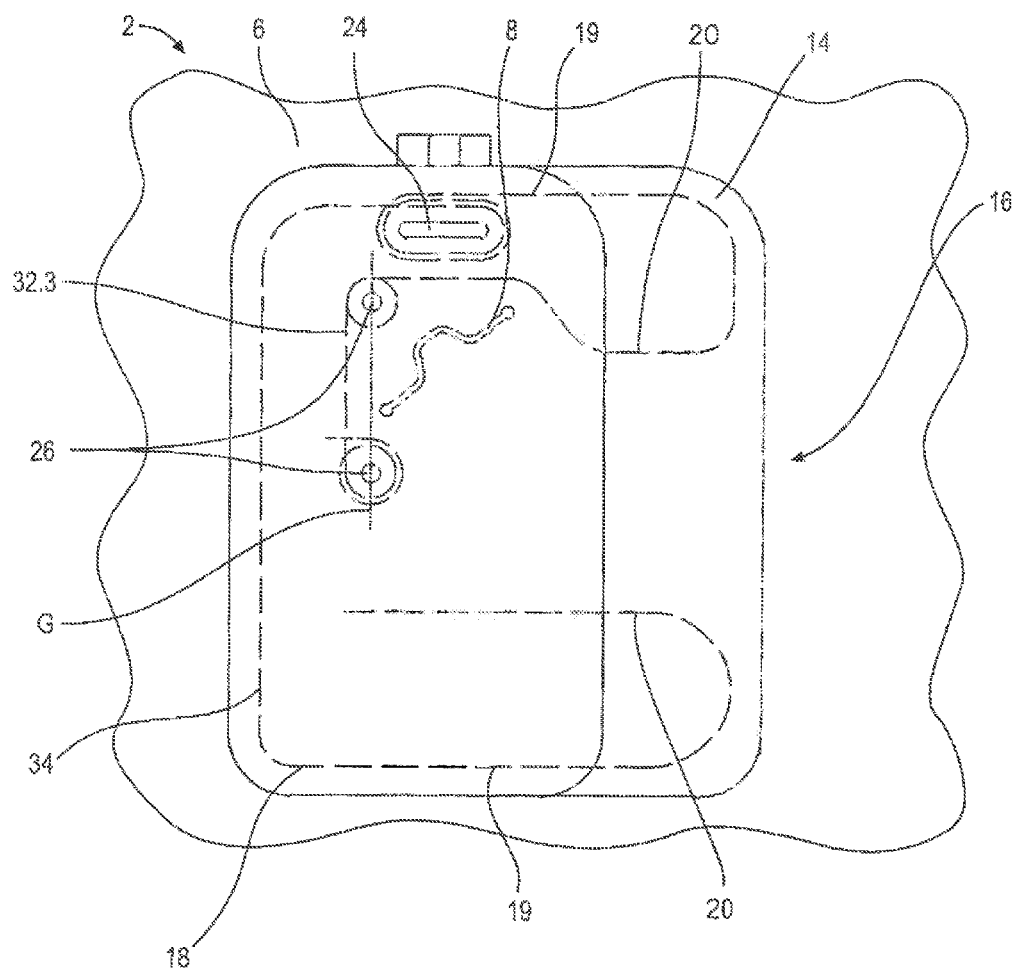
FIG. 5 shows a third embodiment of the airbag according to the invention from inside in the area of the inserting orifice.

In FIG. 5 a third embodiment of the airbag 2 is shown in the area of the fastening of the inflator 4.

In this embodiment the reinforcing layer 14 has an almost rectangular design. The individual layers of the reinforcing layer 14 also can be of different size as long as they comprise the orifices 8, 24, 26.

In the third embodiment according to FIG. 5, too, the fastening strip 13 extends substantially in U-shape, but the igniter orifice 24 and the fastening orifices 26 are arranged differently relative to the U-shaped part of the fastening strip 18.

In contrast to the previous embodiments in which an imaginary straight line G is aligned between the two fastening orifices 28 perpendicularly to the center piece 34 of the fastening strip 18, now this straight line G is located in parallel to the center piece 34 in the third embodiment according to FIG. 5.

The igniter orifice 24 is located in the direction of the straight line G spaced apart from the fastening orifices 26, wherein the longitudinal extension of the fastening orifice 26 can be perpendicular to the straight line G in each of the illustrated embodiments.

Equally, the inserting orifice 8 now does no longer extend substantially in parallel to the center piece 34, as in the preceding embodiments, but at an angle of, for example, 45° therewith.

The igniter orifice 24 is now surrounded at least once tightly and completely by a side leg 19 of the fastening strip 18.

In addition, one of the ends 20 of the fastening strip 16 does not run out in hairpin shape but in U-shape and can extend up to the height of the straight line G.

At the other end 20 of the fastening strip 18 the reinforcing strip 32.3 which closely surrounds the fastening orifices 28 is provided.

The reinforcing strip 32.3 also may completely surround only one of the fastening orifices 26.

Hence the reinforcing strip 32.3 constitutes an extension of the end 20 of the fastening strip 18.

In this case the reinforcing strip 32.3 can surround the inserting orifice 8 partly, at least completely along one side, however.

Figure 6:
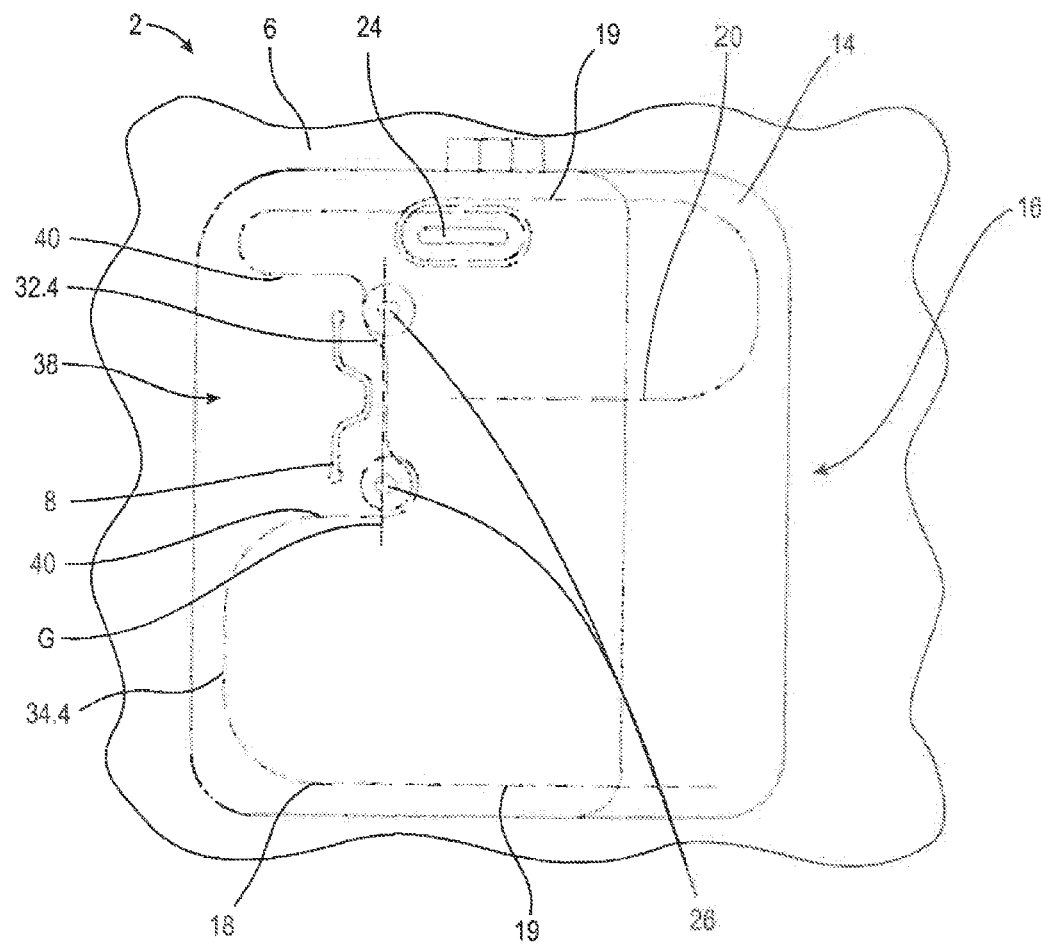
FIG. 6 shows a fourth embodiment of the airbag according to the invention from inside in the area of the inserting orifice.

FIG. 6 illustrates a fourth embodiment in which, similarly to the third embodiment according to FIG. 5, the imaginary straight line G is aligned between the fastening orifices 28 in parallel to the center piece 34.4 and perpendicularly to the side legs 19.

However, in contrast to the preceding embodiments, the center piece 34.4 includes a U-shaped intermediate portion 38 having central legs 40.

The opening of the "U" of the U-shaped intermediate portion 38 faces away from the non-fastened peripheral portion 16 of the reinforcing layer 14.

In this way, the fastening strip 18 is substantially W-shaped.

The fastening strip 18 ends on one side without forming an end 20 extending away from the periphery of the reinforcing layer 14.

The other end of the fastening strip 18 is in the form of an end 20 extending away from the periphery of the reinforcing layer 14, but it need not take the shape of a hairpin.

The end 20 can extend at least partly along a straight line forming a mirror axis of the inserting orifice 8.

The inserting orifice 8 in this embodiment is arranged between the central legs 40 of the U-shaped portion 38 of the center piece 34.4.

In addition, the fastening strip 18 can closely surround the fastening orifices 26 in the area of the U-shaped intermediate portion 38 and thus form the reinforcing strip 32.4. The reinforcing strip 32.4 hence constitutes part of the center piece 34.4.

As a matter of course, the individual features of the described embodiments can be combined to each other, unless they are contradictory, and are not restricted to the use in the respective embodiment.

The invention claimed is:

1. An airbag for a vehicle comprising an airbag shell (6) including an inserting orifice (8) for an inflator (4) and at least one reinforcing layer (14) at the inside of the airbag shell (6) which completely covers the inserting orifice (8) and wherein aligned fastening orifices (26) are provided in the airbag shell (6) and the reinforcing layer (14).

2. The airbag according to claim 1, wherein the reinforcing layer (14) has an approximately trapezoidal cut.

3. The airbag according to claim 1, wherein the reinforcing layer (14) is fastened on the peripheral side of the airbag shell (6), wherein a peripheral portion (16) of the reinforcing layer (14) is not fastened to the airbag shell (6) and is open.

4. The airbag according to claim 3, wherein the reinforcing layer (14) is fastened to the airbag shell (6) on the peripheral side except for the non-fastened peripheral portion (16) while forming a pouch.

5. The airbag according to claim 3, wherein the reinforcing layer (14) is connected to the airbag shell (6) along an at least substantially U-shaped or W-shaped area of a fastening strip (18), especially by a seam, in particular wherein the two side legs (19) of the "U" or "W" extend away from each other to their free ends.

6. The airbag according to claim 5, wherein the inserting orifice (8), preferably all orifices in the area of the reinforcing layer (14), has/have a distance from the non-fastened peripheral portion (16) which corresponds to at least one third of the distance (A) of the non-fastened peripheral portion (16) from a portion of the fastening strip (18) facing the same.

7. The airbag according to claim 6, wherein a reinforcing strip (32; 32.2; 32.3; 32.4) is guided closely around the fastening orifice (26) for connecting the airbag shell (6) to the reinforcing layer (14), especially wherein the reinforcing strip (32; 32.4) starts from the center piece (34) of the fastening strip (18) or forms part of the center piece (34.4).

8. The airbag according to claim 7, wherein the reinforcing strip (32.3) is adjacent to at least one of the ends (20) of the fastening strip (18).

9. The airbag according to claim 1, wherein the inserting orifice (8) is configured as a slit, especially a slit forming a tab.

10. The airbag according to claim 1, wherein the periphery of the reinforcing layer (14) is spaced apart from the inserting orifice (8).

11. The airbag according to claim 1, wherein an igniter orifice (24) extends through the airbag shell (6) and the reinforcing layer (14).

12. The airbag according to claim 11, wherein a fastening strip (18) surrounds the igniter orifice (24) at least once closely and completely, especially wherein a side leg (19) or a center piece (34) surrounds the igniter orifice (24).

13. The airbag according to claim 1, wherein between the airbag shell (6) and the reinforcing layer (14) a protective layer (36) is provided which has the same orifices as the airbag shell (6) and in its entirety is tightly connected to the airbag shell (6).

14. The airbag according to claim 13, wherein the protective layer (36) extends beyond the peripheral portion (16) of the reinforcing layer (14) not fastened to the airbag shell (6), but in the other portions exhibits a cut substantially equal to the reinforcing layer (14).

15. The airbag according to claim 1, wherein the inserting orifice (8) is arranged between the side legs (19) of a fastening strip (18) or between center legs (40) of a center piece (34.4).

16. An airbag module comprising an airbag (2) according to claim 1 and an inflator (4) including at least one fastening means (30) which laterally projects from the inflator (4), wherein the airbag (2) has a fastening orifice (26) for the passage of the fastening means (30) the geometry of which substantially corresponds to that of the cross-section of the fastening means (30) and is preferably smaller than the cross-section of the fastening means (30).

* * * * *